United States Patent
Barnes et al.

(10) Patent No.: US 9,229,944 B2
(45) Date of Patent: Jan. 5, 2016

(54) SCALABLE NETWORKED DIGITAL VIDEO RECORDINGS VIA SHARD-BASED ARCHITECTURE

(71) Applicant: MobiTV, Inc., Emeryville, CA (US)

(72) Inventors: Fritz Barnes, Alameda, CA (US); Kent Karlsson, Berkeley, CA (US); Ren Long, Emeryville, CA (US)

(73) Assignee: MobiTV, Inc., Emeryville, CA (US)

( * ) Notice: Subject to any disclaimer, the term of this patent is extended or adjusted under 35 U.S.C. 154(b) by 198 days.

(21) Appl. No.: 13/752,540

(22) Filed: Jan. 29, 2013

(65) Prior Publication Data

US 2014/0214906 A1 Jul. 31, 2014

(51) Int. Cl.
*G06F 17/30* (2006.01)
*G11B 27/034* (2006.01)
*G11B 27/10* (2006.01)
*H04N 21/254* (2011.01)
*H04N 21/2747* (2011.01)
*H04N 21/436* (2011.01)

(52) U.S. Cl.
CPC ........ *G06F 17/30091* (2013.01); *G11B 27/034* (2013.01); *G11B 27/105* (2013.01); *H04N 21/2541* (2013.01); *H04N 21/2747* (2013.01); *H04N 21/43622* (2013.01); *G11B 2220/412* (2013.01)

(58) Field of Classification Search
CPC ............... G06F 17/30091; H04N 21/2747; H04N 21/43622; G11B 27/034; G11B 27/105; G11B 2220/412
See application file for complete search history.

(56) References Cited

U.S. PATENT DOCUMENTS

| | | | |
|---|---|---|---|
| 7,558,806 B2 | 7/2009 | Bobrovskiy et al. | |
| 7,908,626 B2 * | 3/2011 | Williamson et al. | 725/90 |
| 8,165,304 B2 | 4/2012 | Choi et al. | |
| 8,825,608 B2 * | 9/2014 | Lipstone | 707/688 |
| 2002/0138313 A1 * | 9/2002 | Fujii et al. | 705/5 |
| 2002/0154779 A1 * | 10/2002 | Asano et al. | 380/277 |
| 2002/0174027 A1 * | 11/2002 | Filliger et al. | 705/26 |
| 2009/0125413 A1 | 5/2009 | Le Chevalier et al. | |
| 2009/0248794 A1 * | 10/2009 | Helms et al. | 709/203 |

(Continued)

FOREIGN PATENT DOCUMENTS

WO 2014120692 A1 8/2014

OTHER PUBLICATIONS

"Int'l Application Serial No. PCT/US2014/013459, Search Report and Written Opinion mailed Jun. 10, 2014", 8 pgs.

(Continued)

*Primary Examiner* — Leslie Wong
(74) *Attorney, Agent, or Firm* — Kwan & Olynick LLP (57) ABSTRACT

Techniques and mechanisms described herein facilitate the storage of digital media recordings. According to various embodiments, a system may include a plurality of shards. Each shard may include a storage system operable to store a plurality of digital media recordings. Each shard may also include one or more recording writers. Each recording server may be operable to store digital media recordings stored in the storage system. According to various embodiments, the system may also include a recording manager. The recording manager may be operable to select one of the plurality of shards for storing a designated digital media recording. The recording manager may also be operable to transmit an instruction to the selected shard to store the designated digital media recording.

14 Claims, 10 Drawing Sheets

(56) References Cited

U.S. PATENT DOCUMENTS

| | | | |
|---|---|---|---|
| 2010/0030578 A1 | 2/2010 | Siddique et al. | |
| 2010/0057517 A1 | 3/2010 | Jerkins, Jr. et al. | |
| 2010/0115575 A1* | 5/2010 | Yu et al. | 725/142 |
| 2010/0145791 A1* | 6/2010 | Canning et al. | 705/14.41 |
| 2010/0227688 A1 | 9/2010 | Lee et al. | |
| 2011/0288970 A1* | 11/2011 | Kidron et al. | 705/30 |
| 2013/0104176 A1* | 4/2013 | Rossetti et al. | 725/88 |
| 2013/0177298 A1* | 7/2013 | Wong et al. | 386/299 |
| 2014/0108671 A1* | 4/2014 | Watson et al. | 709/231 |
| 2014/0109154 A1* | 4/2014 | Basse et al. | 725/71 |
| 2014/0149794 A1* | 5/2014 | Shetty et al. | 714/20 |
| 2014/0165116 A1* | 6/2014 | Major et al. | 725/89 |

OTHER PUBLICATIONS

"Remote Storage DVR Technology", SeaChange/Whitepaper, Retrieved from Internet <http://www.schange.com/Collateral/Multi-Screen-and-On-Demand/White-Papers/RS-DVR_WhitePaper_3-16_2012>, Mar. 16, 2012, 12 pgs.

Liao, Heng , "Storage Area Network Architectures", Technology White Paper, Issue 1: Apr. 2003, PMC-2022178, Retrieved from Internet <pmcs.com/cgi-bin/document.pl?docnum=2022178>, Apr. 2003, 36 pgs.

* cited by examiner

SCALABLE NETWORKED DIGITAL VIDEO RECORDINGS VIA SHARD-BASED ARCHITECTURE

TECHNICAL FIELD

The present disclosure relates to the networked storage and retrieval of digital files.

DESCRIPTION OF RELATED ART

Digital Video Recording (DVR) technology allows users to record media content such as television programming for later playback upon request. However, conventional DVR technology suffers from several drawbacks. For example, a DVR device must typically be located and maintained in a user's home. Then, the recordings stored on the DVR are accessible only to the devices to which the DVR is connected, such as a single television located near the DVR. Also, the DVR device must have or be able to access digital storage space located in the home that is adequate for storing the user's digital recordings.

Networked Digital Video Recordings (NDVR) allow centralized recordings of media content to be managed for users and delivered to various devices. NDVR technology has the potential to free users from many of the constraints associated with conventional DVR technology. For instance, recordings may be delivered to a variety of devices such as set top boxes, mobile phones, tablet computers, personal computers, laptops, and smart televisions. These devices may be positioned in a variety of locations and need not be stationary devices in a user's home. Also, with NDVR technology, the user need not own and maintain a device capable of storing the digital content within the home.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate high write-speed storage of files in a storage system. For instance, the files may be digital media recordings stored in a networked digital video recording (NDVR) system. The storage component of the NDVR system may be divided into shards, each of which includes a storage system and a number of recording readers and recording writers. When a user sends a request to store a digital content recording, a recording manager system selects a shard for storing the recording. Then, the NDVR system can provide the digital content recording to the user upon request.

Example Embodiments

According to various embodiments, users may receive content from a content management service. The content management service may facilitate the interaction of users with various types of content services. For instance, the content management service may provide a user interface for managing and accessing content from a number of different content sources. The interface may display content received via a cable or satellite television connection, one or more on-demand-video service providers such as Netflix or Amazon, and content accessible on local or network storage locations. In addition, the interface may be used to access this content on any number of content playback devices.

According to various embodiments, users may store and retrieve digital media recordings with a networked digital video recording (NDVR) service. An NDVR service may be provided by a content distributor, a content provider, or another entity. However, media content stored in a network-accessible location may be subject to various types of rights defined by the content provider. For instance, a content distributor may provide an NVDR service and distribute content that the distributor receives from a content provider such as a cable television broadcaster. The content provider may impose a requirement that the content distributor maintain one copy of a digital media recording for each user that has access to the digital media recording via the NVDR service.

These and other requirements can in some instances create various problems for managing the NDVR service. For instance, one problem is handling the scale of writes required. Effectively, write bandwidth is determined by the number of digital media recording copies being recorded for playback. For example, a particular NVDR service may require 3.5 Mbps of recording capability per user's recordings to meet a designated quality level. The NVDR system may need to support 100,000 users recording content simultaneously, for instance when recording a popular film on a Saturday night or a live sporting event such as the Superbowl. In this case, the NVDR system would need to support 350 Gbps of write capacity.

Since conventional storage systems commonly have write limits in the range of 10-100 Gbps, conventional storage systems are inadequate for the purpose of providing these storage speeds. Some specialized storage systems have higher write limits. However, these specialized storage systems are often more expensive than commodity systems. Specialized storage systems also require more technical expertise to operate, are more difficult to upgrade, and are more fragile than commodity systems. Furthermore, specialized storage systems still suffer from significant write speed limitations.

In particular embodiments, techniques described herein may be used in conjunction with commodity storage systems. Accordingly, techniques described herein may be used to achieve considerable scalability and high write speeds without modification to the underlying storage system. Nevertheless, techniques described herein are not limited to use with commodity storage systems and are generally applicable to a wide variety of storage techniques.

In particular embodiments, the techniques described herein may be used to provide improved write speeds in situations where write throughput exceeds read throughput. For example, a particular digital content item may be particular popular for recording and thus generate a high write load. As another example, a particular time (e.g., Friday night, Saturday night, 6:00 pm, a holiday such as Thanksgiving Day) may be particularly popular for recording and thus generate a high write load. However, caching may allow multiple readers to access the same copy without incurring multiple reads of the storage system.

According to various embodiments, an NDVR system may be capable of storing copies of digital recordings and then providing those copies of the digital recordings upon request to client machines. The NDVR system may include communication components for communicating with client machines and content providers, a storage component for storing the digital recordings, management components for managing the NDVR system, and other subsystems.

According to various embodiments, techniques described herein may be capable of providing some or all of the following storage-related capabilities. First, the system may be capable of splitting the recording of files into multiple groups with minimal processing. Second, the system may support access or playback via a single endpoint or a limited number of endpoints. Third, the system may be capable of storing metadata for each user and each stored recording. Fourth, the system may be capable of scaling even though a single storage system has limits in the throughput achievable with the storage system.

According to various embodiments, higher write capacity may be achieved by dividing the storage component of the system into shards. Each shard includes a number of recording writers and recording readers that are capable of writing to and reading from a storage system included within the shard. Additional throughput may be achieved by adding more shards. For instance, if each shard employs a storage system that can support 10 gbps of input video, 35 shards may be used in parallel to support a total write speed of 350 gbps.

In some conventional systems, one storage subsystem may be allocated to a first set of users while a second storage subsystem is allocated to a second set of users. However, when allocating users to the system it is difficult to determine which users will use a large amount of storage and which users will use a relatively small amount of storage space, which may result in suboptimal storage space allocation. Accordingly, in the example described above, if the first set of users includes a disproportionate number of high-usage users, the first storage subsystem may be overused while the second storage subsystem is underused. In order to allow for efficient usage and scaling of such a system, user data would need to be copied from one storage subsystem to another, which adds considerable overhead to the storage component of the NDVR system.

In particular embodiments, stored recordings may be distributed over the shards to offer improved write speed. Allowing recordings to be allocated to any available shard may eliminate or reduce the need to balance the number of users on each shard. For example, recording requests may be distributed among shards so that different shards are operating at substantially similar write speeds at a given time. As another example, recording requests may be distributed among shards so that different shards operate at substantially similar levels of storage capacity. Then, a directory system may store metadata so that a controller such as a recording manager can identify where digital media recordings are stored among the various shards.

In particular embodiments, a user's recordings may be spread across different shards. A directory may be maintained within the content delivery network to store metadata that can be leveraged to track the location of recordings among the shards. Client requests can include the shard storage location information in the request, such as in the query portion of a URL. Then, the content delivery network may easily access stored recordings. At the same time, the content delivery network may store and access cached recordings by ignoring certain identifying information, such as the shard storage location information.

According to various embodiments, techniques described herein may allow storage with scalable write throughput. In some instances, techniques may be applied to systems that employ commodity storage system components. Further, techniques may allow scalable write throughput while reducing or eliminating the need to perform user balancing across storage subsystems after recordings have been stored. Finally, such storage techniques may offer easier operational management of the storage system, for instance by reducing the necessary amount of administrator time and effort in balancing users across different storage subsystems.

According to various embodiments, techniques and mechanisms described herein may be used for any streaming format. In particular embodiments, techniques and mechanisms described herein may be used in conjunction with a streaming format that relies on the transfer of small files or file segments. However, the techniques and mechanisms are generally applicable to a wide range of video content technologies.

Although the content is often referred to herein as video content, the techniques and mechanisms described herein are generally applicable to a wide range of content and content distribution frameworks. For example, the content may be media content such as video, audio, or image content.

The storage capacity, write speed, read speed, and other characteristics described herein are included for the purpose of clarity and to provide examples. Computer hardware, software, and networking characteristics change over time. Nevertheless, the techniques described herein are widely applicable to storage systems and frameworks having various hardware, software, and networking characteristics.

According to various embodiments, the techniques described herein may be used in conjunction with an NDVR service configured for providing access to digital media recordings via a network. However, the techniques described herein are generally applicable to a variety of storage systems.

Figure 1:
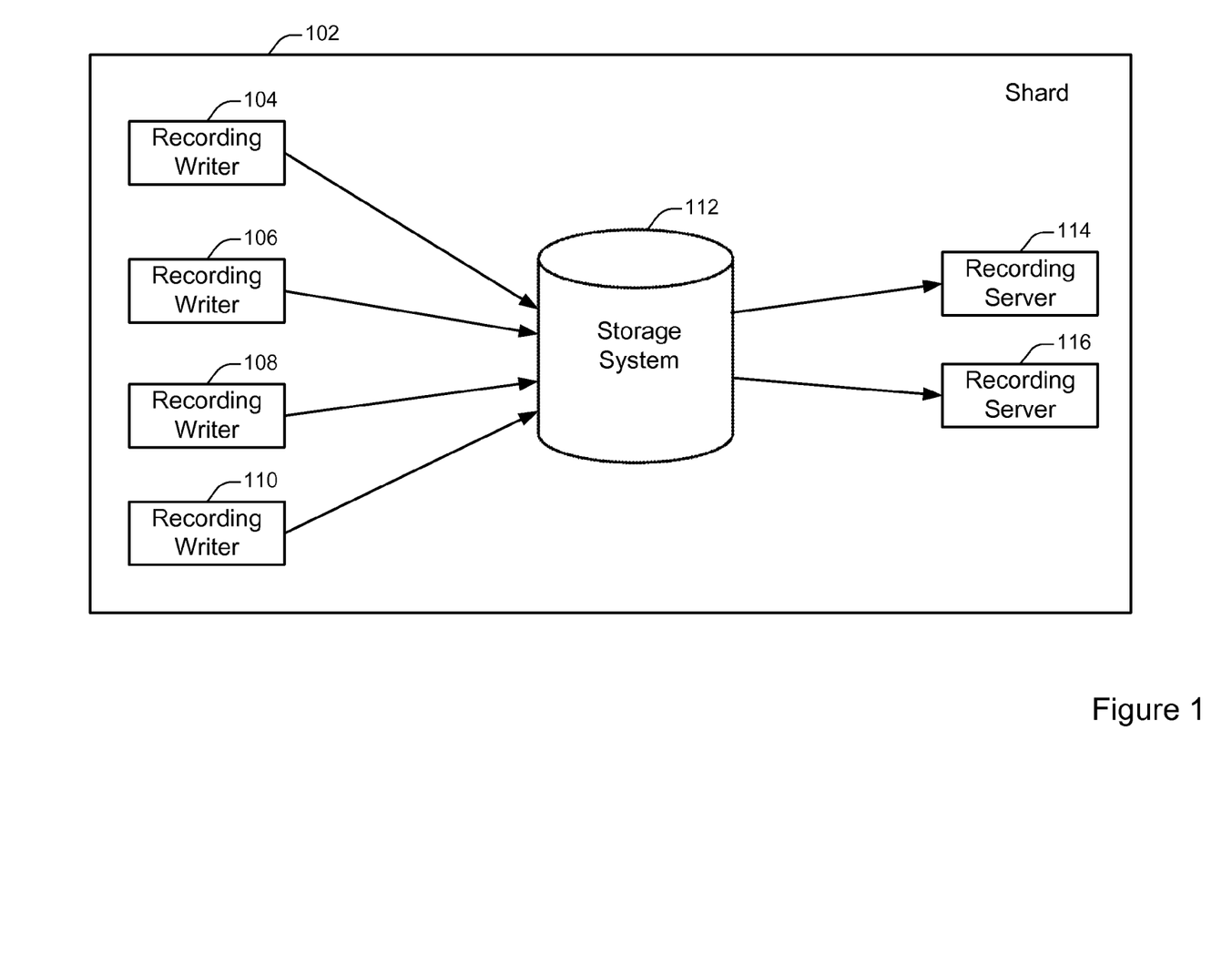
FIG. 1 illustrates one example of a shard 102, configured in accordance with one or more embodiments.

FIG. 1 illustrates one example of a shard 102, configured in accordance with one or more embodiments. According to various embodiments, the shard 102 is located on a network accessible to a content distributor. The shard 102 includes recording writers 104, 106, 108, and 110, a storage system 112, and recording servers 114 and 116.

According to various embodiments, the shard 102 is configured to store digital content recordings received via a network. Each digital recording is received at a recording writer and stored in the storage system 112. Then, a digital recording may be retrieved upon request by a recording server.

At 104, a recording writer is shown. According to various embodiments, the recording writer 104 is configured to receive a digital recording via a network. The recording writer 104 then stores the recording in the storage system 112. The recording writer 104 may perform operations such as transmitting storage instructions to the storage system and identifying metadata for the digital recording.

The shard 102 includes 4 recording writers. However, according to various embodiments, the shard 102 may contain any number of recording writers. For instance, a shard may include one, ten, or fifty recording writers. The number of recording writers may be strategically determined based on a number of factors which may include, but are not limited to, the write speed of each recording writer, the aggregate write speed of the storage system 112, and the data transfer speed of the network on which the shard 102 is located. For instance, if the storage system 112 is capable of writing at 100 gbps and each recording writer is capable of writing at 10 gbps, then the shard 102 may include 10 recording writers so that the aggregate write speed of the recording writers matches the recording speed of the storage system 112.

At 112, the storage system is shown. According to various embodiments, the storage system may be any device or arrangement of devices capable of storing data for retrieval. For instance, the storage system may include a file system implemented on a hard drive or combination of hard drives. In particular embodiments, the storage system 112 may be a commodity storage system such as a storage area network (SAN), network attached storage (NAS), or Lustre™ file system. Alternately, or additionally, the storage system 112 may be a customized or specialized system.

At 114, a recording server is shown. According to various embodiments, the recording server is configured to receive a request to retrieve a recording stored on the storage system 112 and provide the recording for transmission via a network. For instance, the recording server 114 may receive a request for a particular recording, identify the location of the recording in the storage system 112, transmit a request to the storage system 112 to retrieve the recording, and then transmit the retrieved recording. The retrieved recording may be transmitted directly to a client machine, to a caching system, to an intermediate system configured to communicate with a client machine, or to any other subsystem.

According to various embodiments, the functions performed by the recording server may overlap considerably, or may be identical to, the functions performed by the fragmentation server described elsewhere in this application. A recording server may also be referred to herein as a reader. Fragmentation servers and operations performed at least in part by fragmentation servers are described in greater detail with respect to FIGS. 4, 5, 9, and 10.

Figure 2:
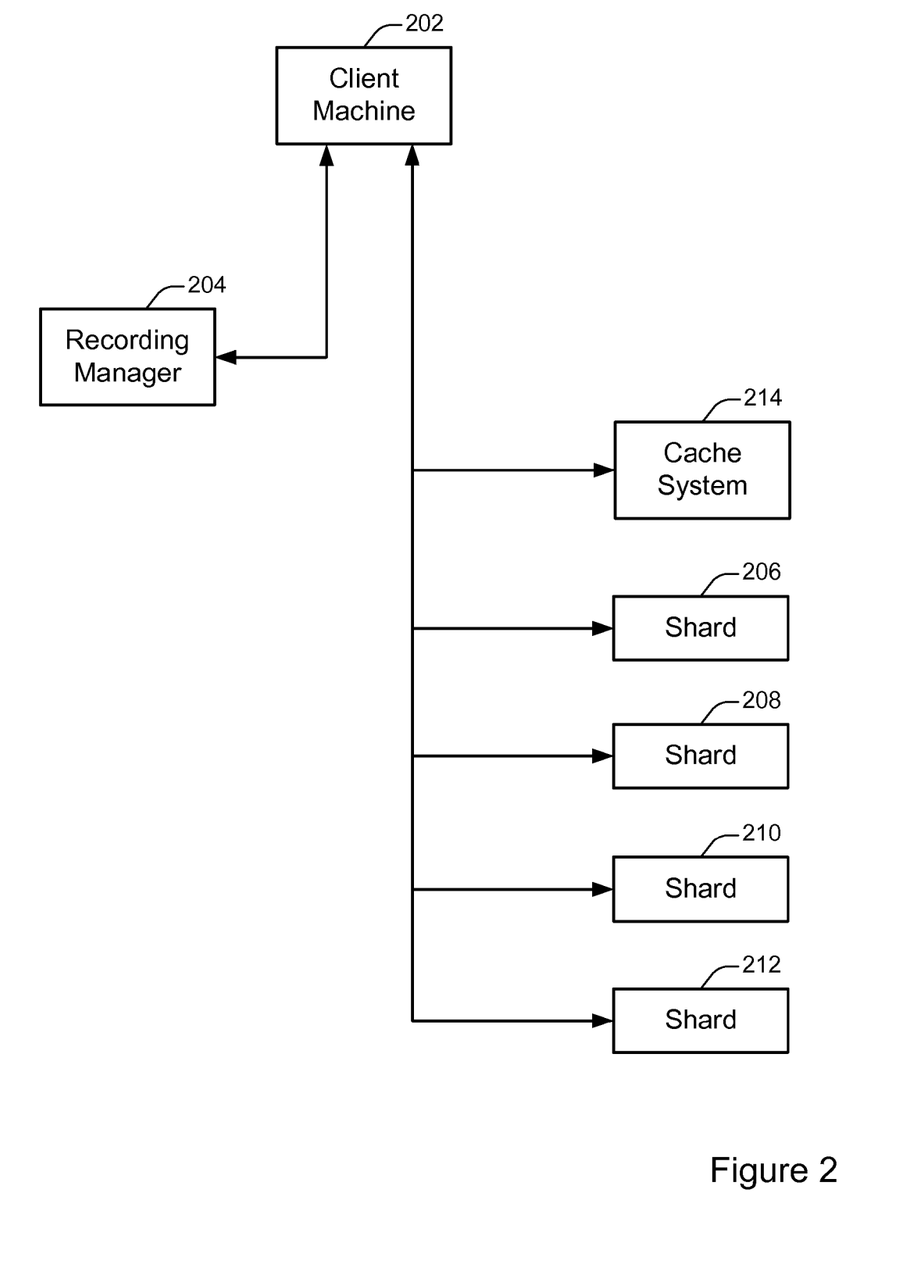
FIGS. 2-5 illustrate examples of systems that can be used with various techniques and mechanisms of the present invention.

FIG. 2 illustrates one example of a client machine in communication with various elements of a storage component of a digital video recording system, configured in accordance with one or more embodiments. According to various embodiments, the elements of the storage component shown in FIG. 2 may be used to store digital media recordings for retrieval upon request.

The configuration of elements shown in FIG. 2 includes a client machine 202 in communication with a recording manager 204. The client machine may also communicate with a cache system 214 and/or the shards 206, 208, 210, and 212.

According to various embodiments, the client machine 202 may transmit a request to the recording manager 204 for information indicating how to retrieve a digital video recording. The request may identify a user or content management account associated with the client machine 202. This identifying information may be used to determine if the account is associated with a copy of a recording of the requested digital video recording and, if so, where the copy is located among the shards.

According to various embodiments, the recording manager 204 is configured to access a data directory or database that indicates where among the shards the requested copy of the digital video recording is located. The recording manager 204 determines that the user requesting the digital video recording has permission to access it.

According to various embodiments, the recording manager 204 may determine whether the requested digital video recording is stored in the cache system 214. Alternately, the recording manager 204 may provide address information to the client machine 202 that can be used to query the cache system 214 to determine whether a cached copy is present. Communication between the client machine 202 and the recording manager 204 is discussed in additional detail with respect to FIG. 7.

According to various embodiments, the client machine 202 uses the information received from the recording manager 204 to request the digital media recording. The information can be used to first send a request to the cache system 214. The cache system 214 may ignore any personalized information included in the request, such as user identification information and shard identification information. The cache system 214 may analyze the cache to determine whether the requested digital video recording has been cached.

According to various embodiments, a cached digital video recording copy may be provided to the client machine with less overhead such as storage system access than a copy that is not cached. The cache system may maintain copies of recently and/or frequently accessed digital video recordings. For instance, if many users are requesting copies of a popular recording such as the recent Superbowl, a copy of the recording may be stored in the cache to facilitate efficient transfer to client machines and to minimizing computing resource expenditure.

According to various embodiments, if the requested digital video recording is not cached, then a request may be transmitted to the appropriate shard to retrieve a copy of the digital video recording. The location of the digital video recording may be identified in the information transmitted by the recording manager 204. The location information may identify which of the shards 206, 208, 21, and 212 is storing the requested digital video recording copy. The retrieval of a digital video recording copy is discussed in further detail with respect to FIG. 8.

According to various embodiments, an NDVR system may include any number of shards. For instance, FIG. 2 depicts four shards, but other NDVR systems may include one shard, two shards, ten shards, fifty shards, or any other number of shards. The number of shards may be increased to scale the write capacity of the NDVR storage component. For example, in one example each shard may support a write capacity of 100 gbps. To achieve a total write capacity of 500 gbps, five shards may be used.

In particular embodiments, not all shards need exhibit the same write capacity, just as not all recording readers need exhibit the same write capacity. Write capacity, read capacity, and other capabilities may depend on hardware and software characteristics of the underlying system. For instance, one storage system, recording writer, fragmentation server, hard drive, network interface, or other subsystem may be replaced with a different subsystem that has different capabilities and characteristics.

According to various embodiments, a storage component of an NDVR system may include communication links not shown in FIG. 2. For instance, the recording manager 204 is capable of communicating the location of a requested digital video recording to the client machine 202. Accordingly, the recording manager 204 may coordinate with the shards when the digital video recording is originally stored on the shards. The recording manager 204 may then maintain or access a database of storage locations indicating where each copy of each digital video recording is stored among the shards.

According to various embodiments, a storage component of an NDVR system may include components and subsystems not shown in FIG. 2. For instance, the client machine 202 may communicate with the cache system 214 and the shards via a server that coordinates the communication. The client machine 202 may transmit a request to the server, which may then determine whether the requested digital video recording is cached in the cache system 214. The server may then direct the transmission of the requested recording from the appropriate network location to the client machine 202.

Figure 3:
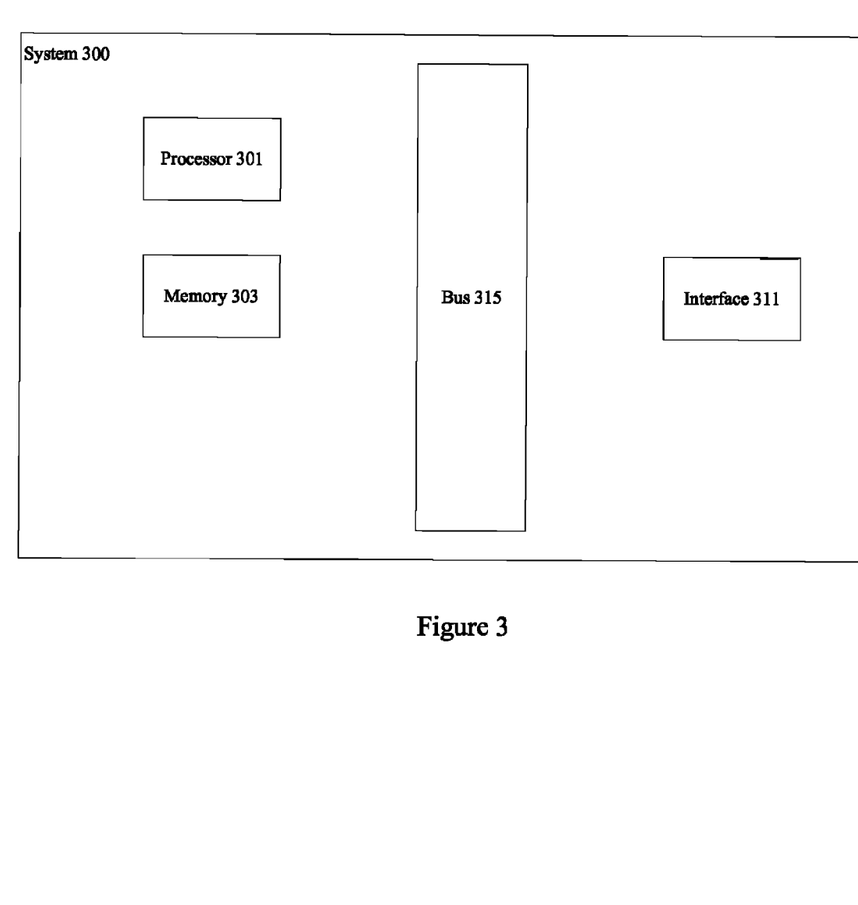

FIG. 3 illustrates one example of a server. According to particular embodiments, a system 300 suitable for implementing particular embodiments of the present invention includes a processor 301, a memory 303, an interface 311, and a bus 315 (e.g., a PCI bus or other interconnection fabric) and operates as a streaming server. When acting under the control of appropriate software or firmware, the processor 301 is responsible for modifying and transmitting live media data to a client. Various specially configured devices can also be used in place of a processor 301 or in addition to processor 301. The interface 311 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 300 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

Figure 4:
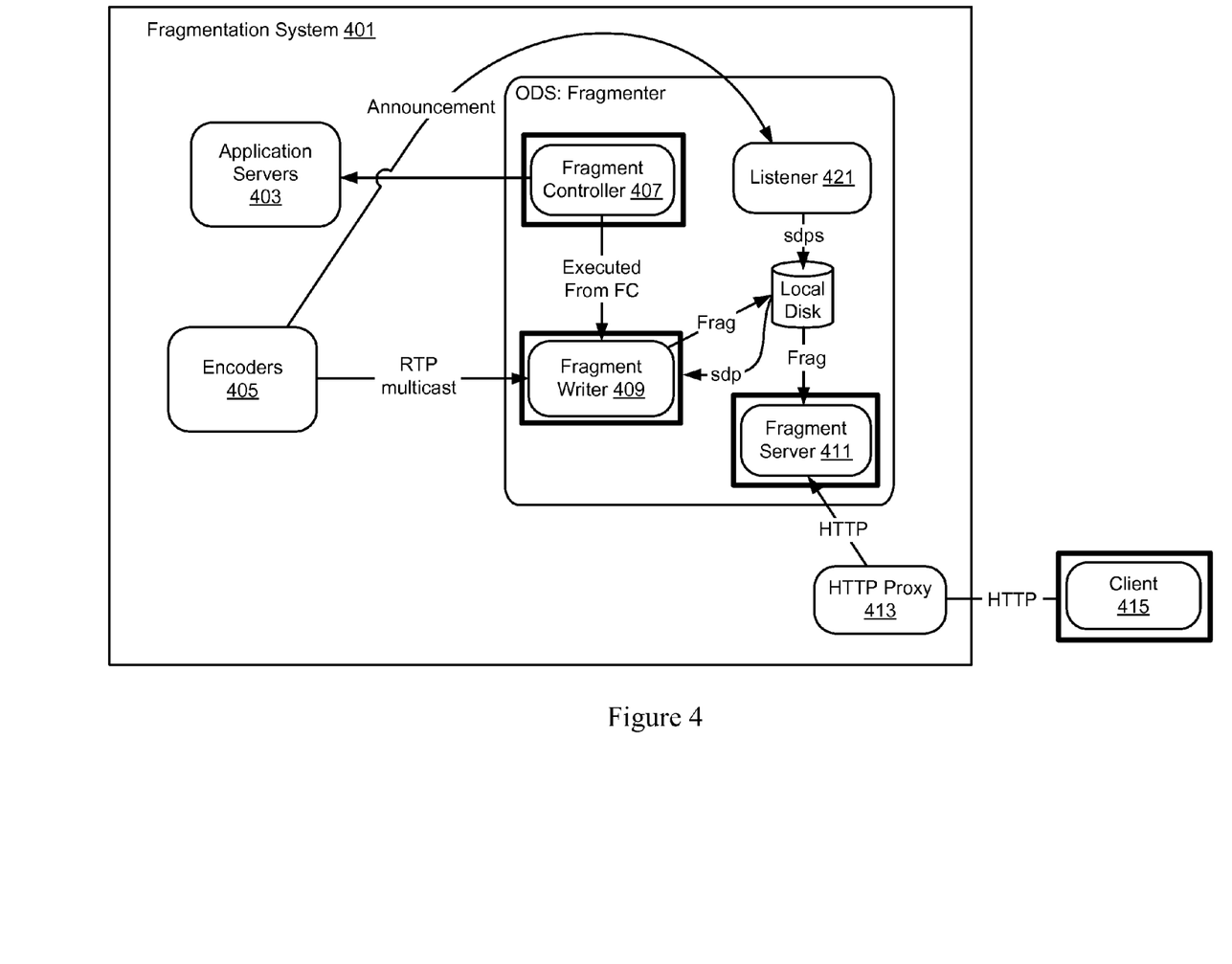

FIG. 4 is a diagrammatic representation illustrating one example of a fragment or segment system 401 associated with a content server that may be used in a broadcast and unicast distribution network. Encoders 405 receive media data from satellite, content libraries, and other content sources and sends RTP multicast data to fragment writer 409. The encoders 405 also send session announcement protocol (SAP) announcements to SAP listener 421. According to various embodiments, the fragment writer 409 creates fragments for live streaming, and writes files to disk for recording. The fragment writer 409 receives RTP multicast streams from the encoders 405 and parses the streams to repackage the audio/video data as part of fragmented MPEG-4 files. When a new program starts, the fragment writer 409 creates a new MPEG-4 file on fragment storage and appends fragments. In particular embodiments, the fragment writer 409 supports live and/or DVR configurations.

The fragment server 411 provides the caching layer with fragments for clients. The design philosophy behind the client/server application programming interface (API) minimizes round trips and reduces complexity as much as possible when it comes to delivery of the media data to the client 415. The fragment server 411 provides live streams and/or DVR configurations.

The fragment controller 407 is connected to application servers 403 and controls the fragmentation of live channel streams. The fragmentation controller 407 optionally integrates guide data to drive the recordings for a global/network DVR. In particular embodiments, the fragment controller 407 embeds logic around the recording to simplify the fragment writer 409 component. According to various embodiments, the fragment controller 407 will run on the same host as the fragment writer 409. In particular embodiments, the fragment controller 407 instantiates instances of the fragment writer 409 and manages high availability.

According to various embodiments, the client 415 uses a media component that requests fragmented MPEG-4 files, allows trick-play, and manages bandwidth adaptation. The client communicates with the application services associated with HTTP proxy 413 to get guides and present the user with the recorded content available.

Figure 5:
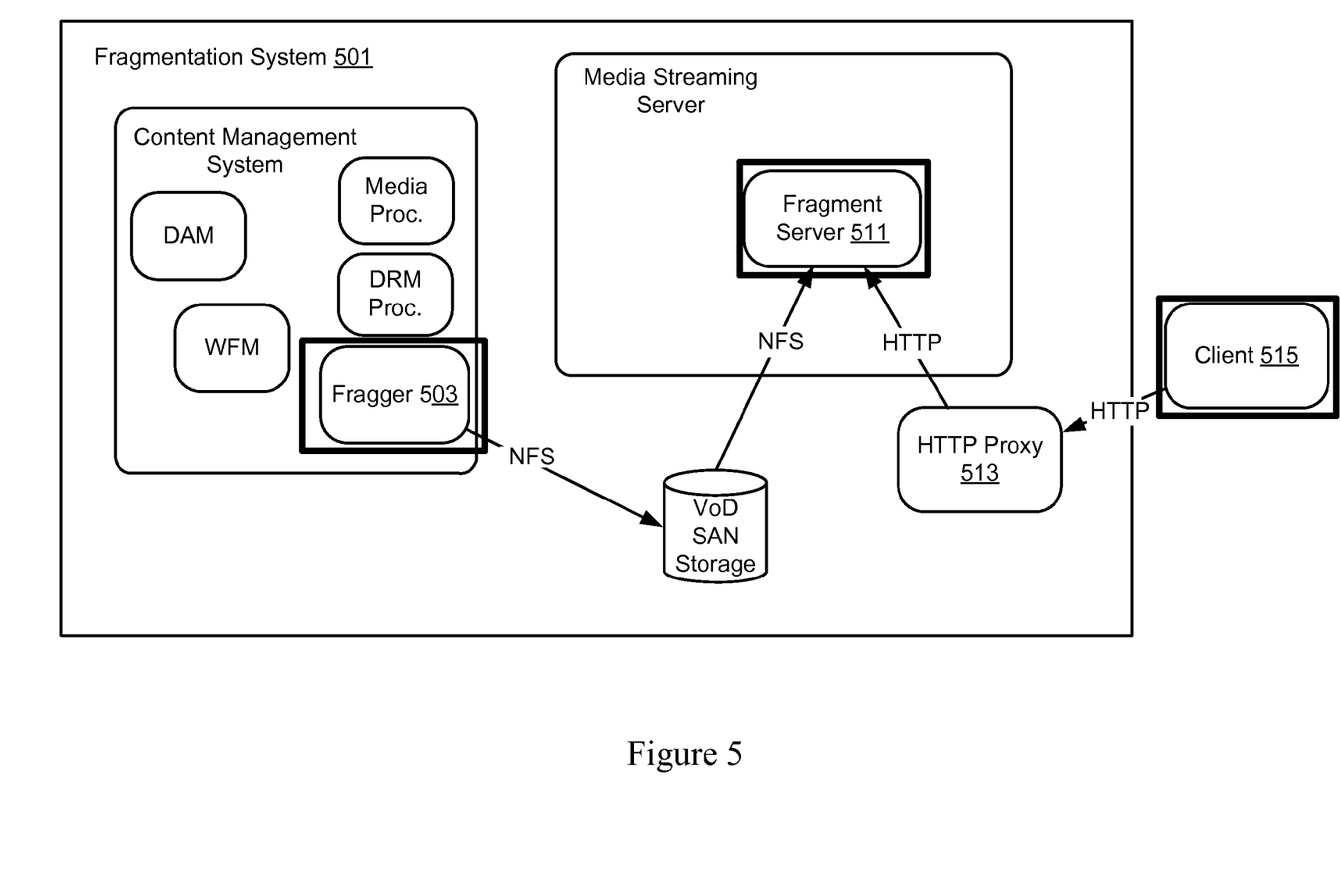

FIG. 5 illustrates one example of a fragmentation system 501 that can be used for video-on-demand (VoD) content. Fragger 506 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 511 provides the caching layer with fragments for clients. The design philosophy behind the client/server API minimizes round trips and reduces complexity as much as possible when it comes to delivery of the media data to the client 515. The fragment server 511 provides VoD content.

According to various embodiments, the client 515 uses a media component that requests fragmented MPEG-4 files, allows trick-play, and manages bandwidth adaptation. The client communicates with the application services associated with HTTP proxy 513 to get guides and present the user with the recorded content available.

Figure 6:
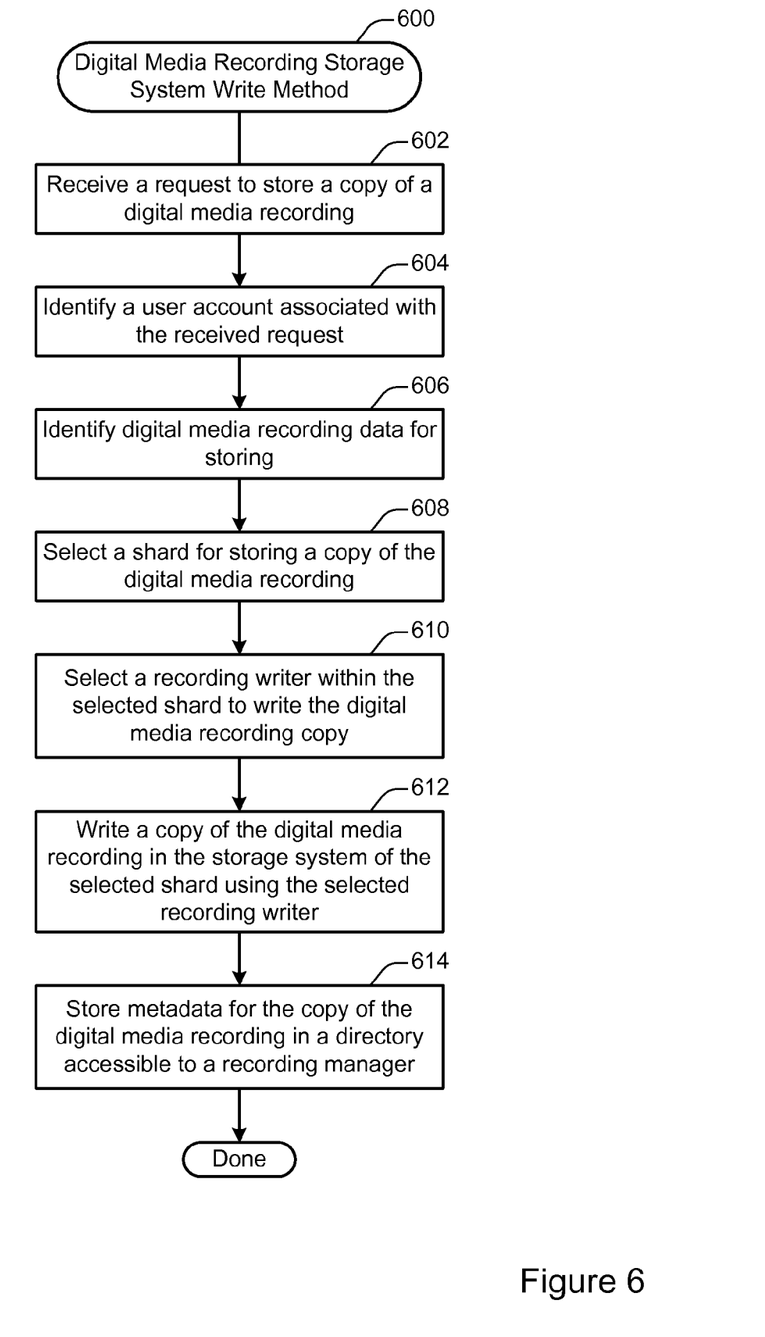
FIG. 6 illustrates an example of a digital media recording storage system write method.

FIG. 6 illustrates an example of a digital media recording storage system write method 600. According to various embodiments, the method 600 may be used to identify digital media such as digital video for recording and then store the digital media on a shard for subsequent retrieval.

At 602, a request to store a copy of a digital media recording is received. According to various embodiments, the request may be received at a recording manager such as the recording manager 204 discussed with respect to FIG. 2. The request may be received from a user of a content management system. The request may be generated by the user or may be generated automatically. For instance, the user may transmit a request to store a copy of a digital recording of a broadcast or cable television program when the program is broadcast in the future.

At 604, a user account associated with the received request is identified. According to various embodiments, a user account or content management account may be associated with the NDVR system. The content management account may be associated with access information that indicates access rights associated with the content management account. The access rights may allow users associated with the content management account to receive digital media content from one or more digital media content providers.

According to various embodiments, the content management account may be identified based on information transmitted with the request received at operation 602. For instance, the user may have previously logged in to a content management account. Then, a web browser cookie or other identifying information may be transmitted along with the request to store a copy of the digital media recording received at operation 602.

At 606, digital media recording data is identified for storing. According to various embodiments, the digital media recording data may be digital media content that is being broadcast over a network such as broadcast television, satellite television, cable television, the Internet, or some other network. The digital media content may be broadcast in a live streaming format such that the user identified at operation 604 has the right to access the digital media content. However, the digital media content may be unavailable after it is broadcast unless it is stored in some way.

According to various embodiments, the digital media recording data may be received by the NDVR system for storing copies of recordings. For instance, the Superbowl may be broadcast by a particular television network. The NDVR system may then receive a copy of the broadcast stream. Some number of users (e.g., 100,000) may each request to store a copy of the broadcast in the NDVR system for later replay. Accordingly, the NDVR system may transmit one copy of the broadcast stream per each of the 100,000 users for storage in a shard.

At 608, a shard is selected for storing a copy of the digital media recording. As discussed with respect to FIG. 2, the storage component of an NDVR system may include various numbers of shards. According to various embodiments, the shard may be selected based on various factors, which may include, but are not limited to, shard storage capacity and shard write capacity. For example, one shard may be at 75% storage capacity while another shard may be at 50% storage capacity. In this case, the second shard may be selected. As another example, one shard may be at 60% write capacity while another shard may be at 80% write capacity. In this example, the first shard may be selected. In this way, the storage volume and/or write capacity utilization may be distributed among the shards.

At 610, a recording writer within the selected shard is selected to write the digital media recording copy. According to various embodiments, the shard may be selected based on write throughput capacity. For example, the shard may include ten recording writers and may be using only six of them to write data at a particular point in time. Then, one of the unused recording writers may be selected. As another example, the shard may include some number of recording writers that are each writing at full speed. Then, the digital media recording copy may be added to a write queue associated with one of the shards, such as the shard with the shortest write queue.

At 612, a copy of the digital media recording is written in the storage system of the selected shard using the selected recording writer. As discussed with respect to FIG. 2, the recording writer may interact with the storage system located in the shard to store the digital media recording copy.

At 614, the metadata for the copy of the digital media recording is stored in a directory accessible to the recording manager. According to various embodiments, the directory may be used to determine where among the shards the digital media recording copy is stored. The metadata may identify information such as the identity of the user account associated with the recording copy, the identity of the media that is represented by the recording copy, and other such information.

Figure 7:
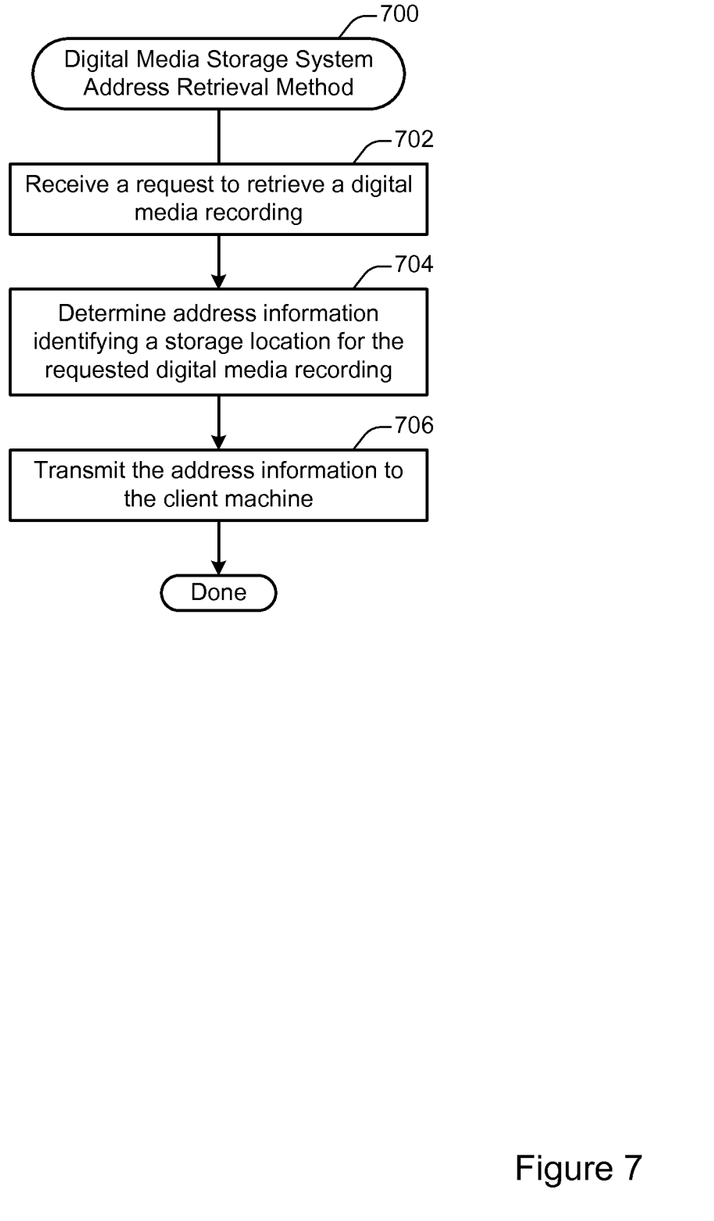
FIG. 7 illustrates an example of a digital media recording storage system address retrieval method.

FIG. 7 illustrates an example of a digital media recording storage system address retrieval method 700. According to various embodiments, the method 700 may be used be a recording manager in communication with a client machine, such as the recording manager and client machine shown in FIG. 2. The method 700 may be used to receive a request for location information identifying access information for a digital media recording from the client machine, identify the requested information, and transmit the information to the client machine. The client machine may then use the information to access the requested digital media recording.

In particular embodiments, the method 700 may be triggered when a user at a client machine requests a copy of the digital media recording. For instance, the user may request a copy the recording from a client device such as a smart television, mobile phone, or computer. The user may request the copy in order to present digital media content that was originally presented in a live broadcast format and then recorded in the NDVR system at the user's request.

At 702, a request to retrieve a digital media recording is received. According to various embodiments, the request may be received at a recording manager, such as the recording manager shown in FIG. 2. As discussed with respect to FIG. 2, the recording manager may be configured to track and provide information identifying the location of recording copies among the various shards.

At 704, address information identifying a storage location for the requested digital media recording is determined. According to various embodiments, the digital recording manager may identify the address information by looking it up in a database or data directory that identifies recording copies stored among the shards.

According to various embodiments, the address information may include various types of information used for accessing the requested media recording copy. For instance, the address information may include the identity of the host at which the recording copy is located, the identity of the recording copy, the file name of the recording copy, an identity of the user account associated with the recording copy, a bit rate at which the recording copy is encoding, a recording identifier, a channel, and/or any other information. The address information may be transmitted piecemeal, in the form of a URL, or in some other form factor.

At 706, the address information is transmitted to the client machine. According to various embodiments, the address information may be transmitted via a network such as the Internet. The address information may then be used by the client machine to retrieve the copy of the digital media recording from the location at which the copy is stored. Techniques for retrieving a digital media recording are discussed in further detail with respect to FIG. 8.

Figure 8:
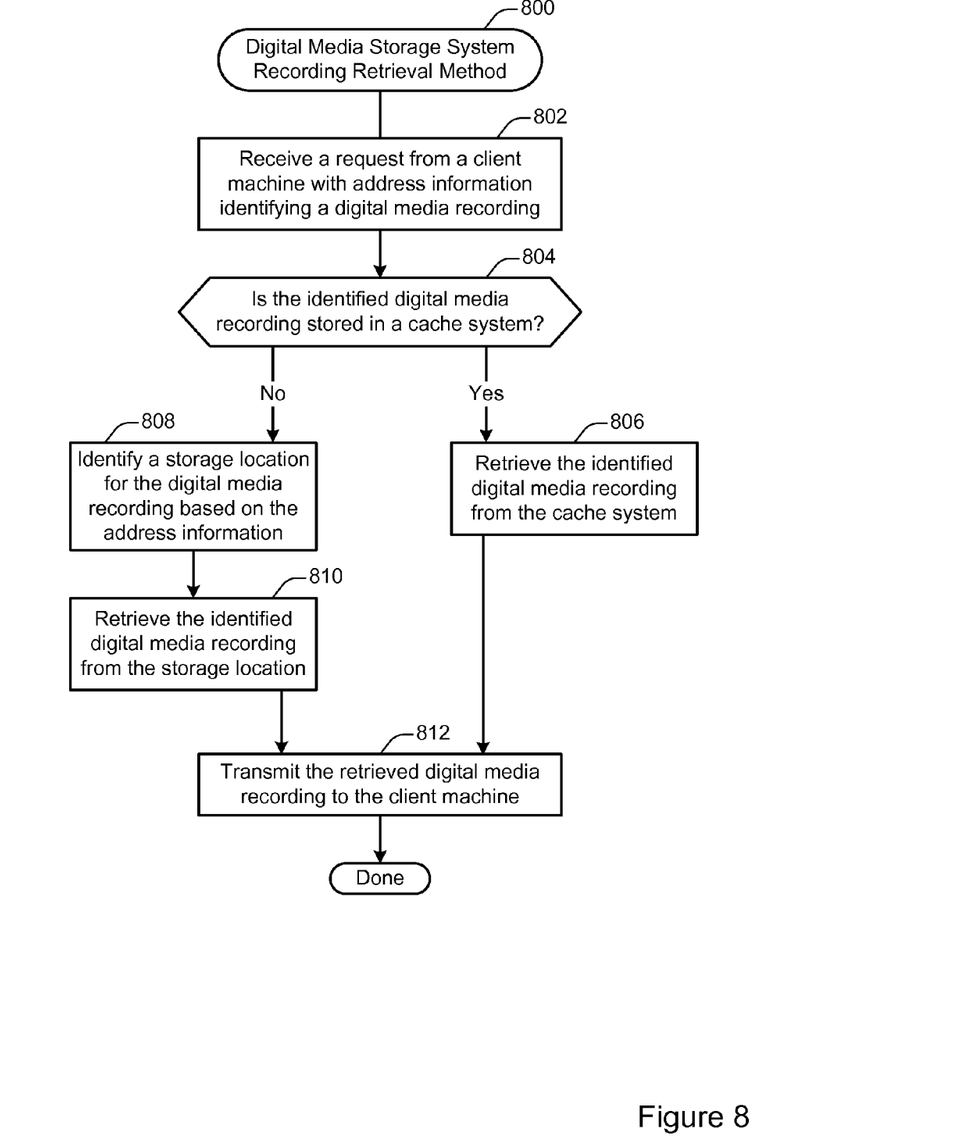
FIG. 8 illustrates an example of a digital media recording storage system recording retrieval method.
Figure 9:
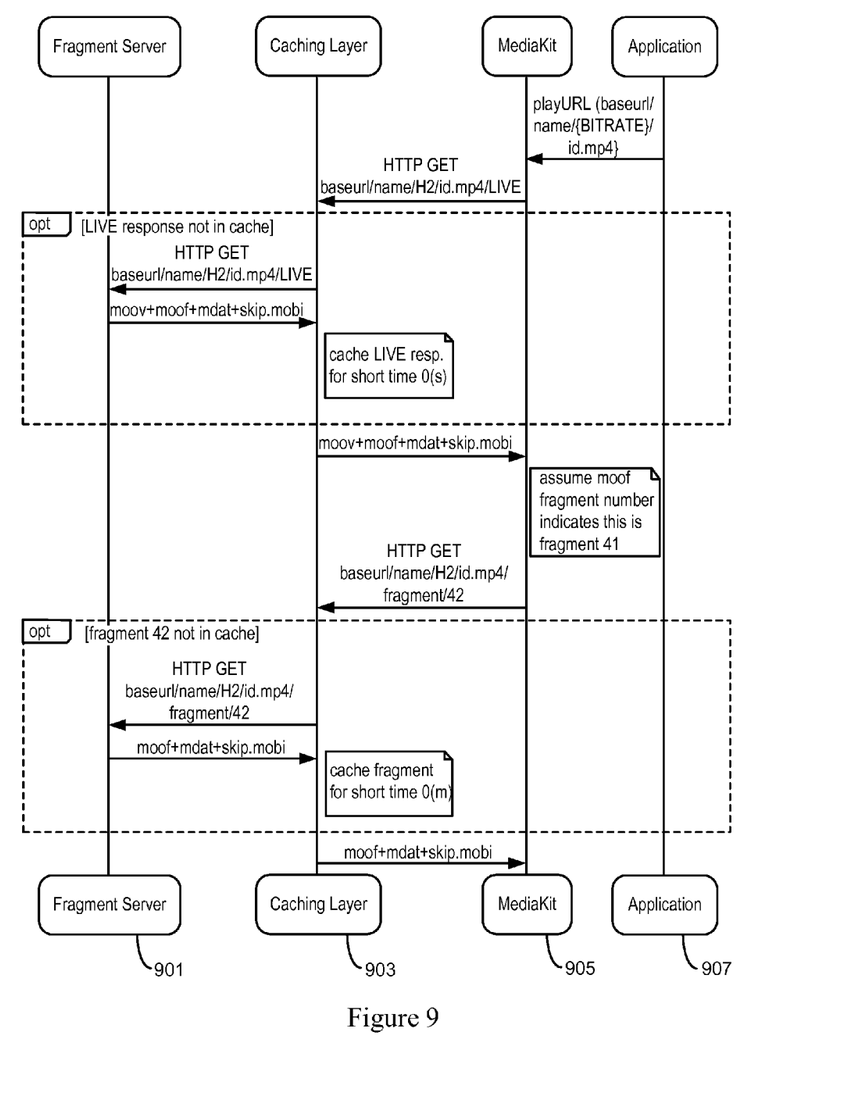
FIG. 9 illustrates one example of an exchange used with a media delivery system.

FIG. 8 illustrates an example of a digital media recording storage system recording retrieval method 800. According to various embodiments, the method 800 may be performed at a digital media system such as those described with respect to FIGS. 1-5 and 9-10. The method 800 may be used to receive a request for a copy of a digital media content recording from a client machine, to locate the digital media content recording copy, and to transmit the digital media content recording copy to the client machine.

At 802, a request is received from a client machine with address information identifying a digital media recording. According to various embodiments, the request may be received at a caching system, at a shard (e.g., at a recording reader located within a shard), or at a server configured to coordinate communication among the shards, the client machine, and/or the caching system.

According to various embodiments, the request may include some or all of the information received from the recording manager as discussed with respect to FIG. 7. For instance, the request may identify the identity of the host at which the recording copy is located, the identity of the recording copy, the file name of the recording copy, an identity of the user account associated with the recording copy, a bit rate at which the recording copy is encoding, and/or any other information.

At 804, a determination is made as to whether the identified digital media recording is stored in a cache system. According to various embodiments, the determination may be made at a server such as a fragmentation server, at the cache system, or at some other element of the content management system. The determination may be made at least in part by searching a database such as a cache system directory with information identifying the recording but omitting user-specific information such as a user identifier, a shard identifier, and other such information.

According to various embodiments, a cached copy of a digital media recording may be stored for popular digital media recordings, for recently accessed digital media recordings, for recently stored digital media recordings, or for any other digital media recordings stored within the system.

At 806, the identified digital media recording is retrieved from the cache system. According to various embodiments, retrieving the digital media recording may involve identifying a location of the digital media recording within the cache system for transmission to the client machine. In some systems, the location information may be transmitted to a different subsystem, such as a server configured to transmit the digital media recording to the client machine.

At 808, a storage location for the digital media recording is identified based on the address information. According to various embodiments, the storage location may be identified based on the information received with the request. For example, the client machine may transmit a request directly to the shard and/or fragmentation server capable of accessing the digital media recording copy. As another example, the client machine may transmit a request to a server, which may then contact the shard on which digital content recording may be accessed.

At 810, the identified digital media recording is retrieved from the storage location. According to various embodiments, as discussed with respect to FIG. 2, the digital media recording may be retrieved by a fragmentation server or recording reader. The fragmentation server may perform operations such as separating the digital media recording into fragments for transmission to the client machine. Fragmentation servers are discussed in further detail with respect to FIGS. 4, 5, 9, and 10.

At 812, the retrieved digital media recording is transmitted to the client machine. As discussed herein, in some embodiments the digital media recording may be transmitted in segments or fragments. Alternately, the digital media recording may be transmitted as a single file or in some other format.

Figure 10:
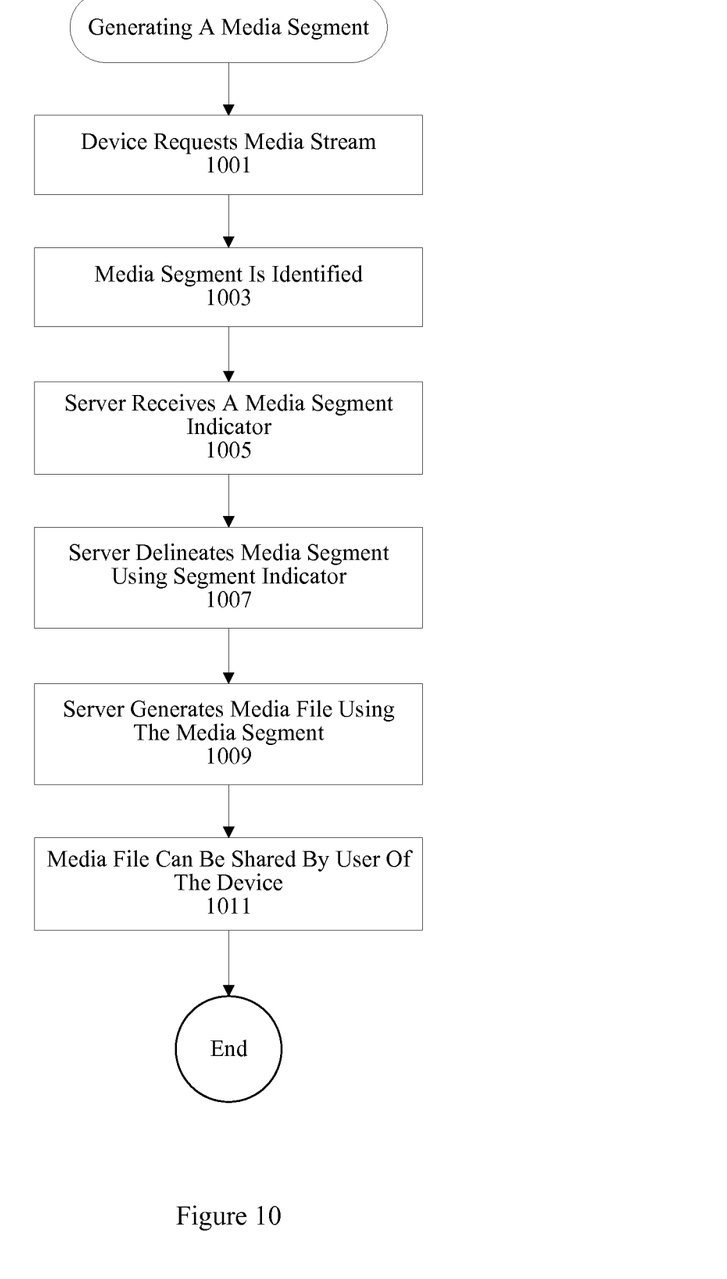
FIG. 10 illustrates one technique for generating a media segment.

FIG. 10 illustrates an interaction for a client receiving a media stream such as a live stream. The client starts playback when fragment 41 plays out from the server. The client uses the fragment number so that it can request the appropriate subsequent file fragment. An application such as a player application 1007 sends a request to mediakit 1005. The request may include a base address and bit rate. The mediakit 1005 sends an HTTP get request to caching layer 1003. According to various embodiments, the live response is not in cache, and the caching layer 1003 forwards the HTTP get request to a fragment server 1001. The fragment server 1001 performs processing and sends the appropriate fragment to the caching layer 1003 which forwards to the data to mediakit 1005.

The fragment may be cached for a short period of time at caching layer 1003. The mediakit 1005 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 1005 may request a next fragment having a different data rate. In some instances, the mediakit 1005 may request a next fragment having a higher data rate. According to various embodiments, the fragment server 1001 maintains fragments for different quality of service streams with timing synchronization information to allow for timing accurate playback.

The mediakit 1005 requests a next fragment using information from the received fragment. According to various embodiments, the next fragment for the media stream may be maintained on a different server, may have a different bit rate, or may require different authorization. Caching layer 1003 determines that the next fragment is not in cache and forwards the request to fragment server 1001. The fragment server 1001 sends the fragment to caching layer 1003 and the fragment is cached for a short period of time. The fragment is then sent to mediakit 1005.

FIG. 11 illustrates a particular example of a technique for generating a media segment. According to various embodiments, a media stream is requested by a device at 1101. The media stream may be a live stream, media clip, media file, etc. The request for the media stream may be an HTTP GET request with a baseurl, bit rate, and file name. At 1103, the media segment is identified. According to various embodiments, the media segment may be a 35 second sequence from an hour long live media stream. The media segment may be identified using time indicators such as a start time and end time indicator. Alternatively, certain sequences may include tags such as fight scene, car chase, love scene, monologue, etc., that the user may select in order to identify a media segment. In still other examples, the media stream may include markers that the user can select. At 1105, a server receives a media segment indicator such as one or more time indicators, tags, or markers. In particular embodiments, the server is a snapshot server, content server, and/or fragment server. According to various embodiments, the server delineates the media segment maintained in cache using the segment indicator at 1107. The media stream may only be available in a channel buffer. At 1109, the server generates a media file using the media segment maintained in cache. The media file can then be shared by a user of the device at 1111. In some examples, the media file itself is shared while in other examples, a link to the media file is shared.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A networked digital video recording system comprising:
a plurality of shards, each shard comprising:
a storage system configured to store a plurality of digital media recordings,
one or more recording writers, each recording writer being configured to store digital media recordings to the storage system, each recording writer being further configured to link a respective digital media recording with metadata identifying a user account associated with the respective digital media recording, and
one or more on-demand recording servers, each recording server being configured to receive a request from a client device to provide a digital media recording as an on-demand media stream, to retrieve the requested digital media recording from the storage system, and to transmit the requested digital media recording as an on-demand media stream to the client device via a network; and
a recording manager configured to:
receive a request to store a plurality of copies of a designated digital media recording,
select, for each of the plurality of copies of the designated digital media recording, one of the plurality of shards for storing the copy of the designated digital media recording, and
transmit an instruction to the selected shard to store the copy of the designated digital media recording.

2. The networked digital video recording system recited in claim 1, wherein the recording manager is further configured to:
determine designated metadata for the designated digital media recording, the designated metadata identifying digital media content corresponding with the digital media recording.

3. The networked digital video recording system recited in claim 2, wherein the designated metadata further comprises account identification information identifying a content management account associated with the digital media recording.

4. The networked digital video recording system recited in claim 2, wherein the recording manager is further configured to:
maintain a metadata directory that includes metadata information associated with the plurality of digital media recordings, the metadata information including the designated metadata.

5. The networked digital video recording system recited in claim 2, wherein the designated metadata comprises storage location identification information that identifies the selected shard and a location within the selected shard at which the designated digital media recording is stored.

6. The networked digital video recording system recited in claim 1, wherein each or selected ones of the plurality of digital media recordings correspond to live broadcasts of digital media content.

7. The networked digital video recording system recited in claim 1, the system further comprising:
a cache system comprising a storage device, the cache system configured to store selected ones of the plurality of digital media recordings for transmission to client machines.

8. A method comprising:
at a recording manager within a networked digital video recording system, receiving a request to store a plurality of copies of a designated digital media recording;
for each of the plurality of copies of the designated digital media recording, selecting via a processor at the recording manager one of a plurality of shards for storing the copy of the designated digital media recording, each shard comprising:
a storage system configured to store a plurality of digital media recordings,
one or more recording writers, each recording writer being configured to store digital media recordings to the storage system, each recording writer being further configured to link a respective digital media recording with metadata identifying a user account associated with the respective digital media recording, and
one or more on-demand recording servers, each recording server being configured to receive a request from a client device to provide a digital media recording as an on-demand media stream, to retrieve the requested digital media recording from the storage system, and to transmit the requested digital media recording as an on-demand media stream to the client device via a network; and transmitting an instruction to the selected shard to store the copy of the designated digital media recording.

9. The method recited in claim 8, the method further comprising:

determining designated metadata for the designated digital media recording, the designated metadata identifying digital media content corresponding with the digital media recording.

10. The method recited in claim 9, wherein the designated metadata comprises account identification information identifying a content management account associated with the digital media recording.

11. The method recited in claim 9, the method further comprising:

maintaining a metadata directory that includes metadata information associated with the plurality of digital media recordings, the metadata information including the designated metadata.

12. The method recited in claim 8, wherein each or selected ones of the plurality of digital media recordings correspond to live broadcasts of digital media content.

13. One or more non-transitory computer readable media having instructions stored thereon for performing a method, the method comprising:

at a recording manager within a networked digital video recording system, receiving a request to store a plurality of copies of a designated digital media recording;

for each of the plurality of copies of the designated digital media recording, selecting via a processor at the recording manager one of a plurality of shards for storing the copy of the designated digital media recording, each shard comprising:

a storage system configured to store a plurality of digital media recordings, one or more recording writers, each recording writer being configured to store digital media recordings to the storage system, each recording writer being further configured to link a respective digital media recording with metadata identifying a user account associated with the respective digital media recording, and one or more on-demand recording servers, each recording server being configured to receive a request from a client device to provide a digital media recording as an on-demand media stream, to retrieve the requested digital media recording from the storage system, and to transmit the requested digital media recording as an on-demand media stream to the client device via a network; and transmitting an instruction to the selected shard to store the copy of the designated digital media recording.

14. The one or more non-transitory computer readable media recited in claim 13, wherein the designated metadata comprises account identification information identifying a content management account associated with the digital media recording.

\* \* \* \* \*